United States Patent [19]

Baron et al.

[11] Patent Number: 5,124,709

[45] Date of Patent: Jun. 23, 1992

[54] METHOD AND APPARATUS FOR DETECTING FIRE, EXPLOSION, AND/OR PROJECTILE PENETRATION

[75] Inventors: Reuven Baron, Haifa; Yechiel Spector, Zahala, both of Israel

[73] Assignee: Spectronix Ltd., Tel-Aviv, Israel

[21] Appl. No.: 729,952

[22] Filed: Jul. 15, 1991

[30] Foreign Application Priority Data

Jul. 20, 1990 [IL] Israel .................................. 95137
Oct. 26, 1990 [IL] Israel .................................. 96129

[51] Int. Cl.$^5$ ........................................... G01S 13/50
[52] U.S. Cl. ................................. 342/192; 342/22
[58] Field of Search .................. 342/192, 61, 22, 26, 342/27, 28

[56] References Cited

U.S. PATENT DOCUMENTS 4,484,193 11/1984 Bellew ................................. 342/22
4,554,546 11/1985 Herbreteau et al. ................. 342/26
4,864,307 9/1989 Potage et al. ...................... 342/192

*Primary Examiner*—Mark Hellner
*Attorney, Agent, or Firm*—Benjamin J. Barish

[57] ABSTRACT

A method and apparatus for detecting the occurrence of a fire or an explosion in a monitored space, or the penetration of a projectile through a barrier, by: transmitting to the monitored space an electromagnetic signal of at least one radio frequency; receiving the transmitted signal as scattered by the monitored space; and analyzing at least one parameter of the received signal to produce an indication whether a fire or explosion has occurred, or a projectile has penetrated through a barrier, in the monitored space.

18 Claims, 10 Drawing Sheets

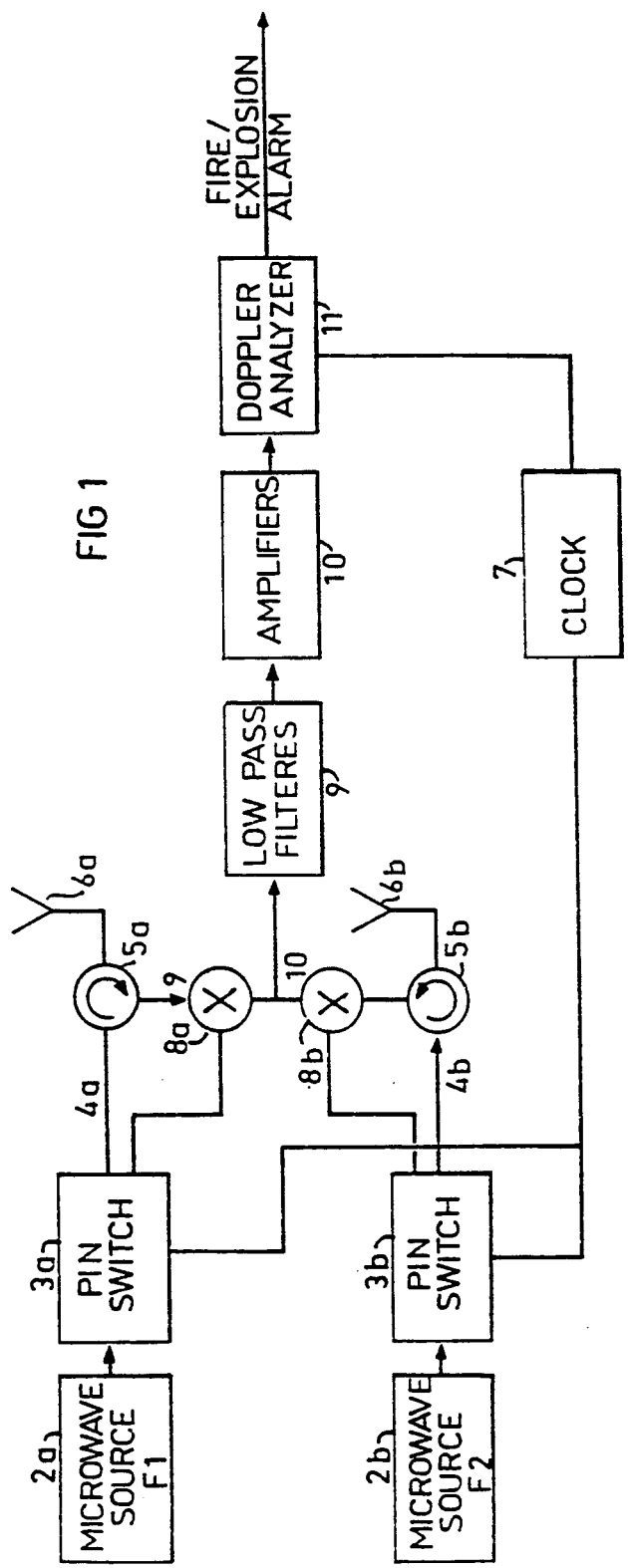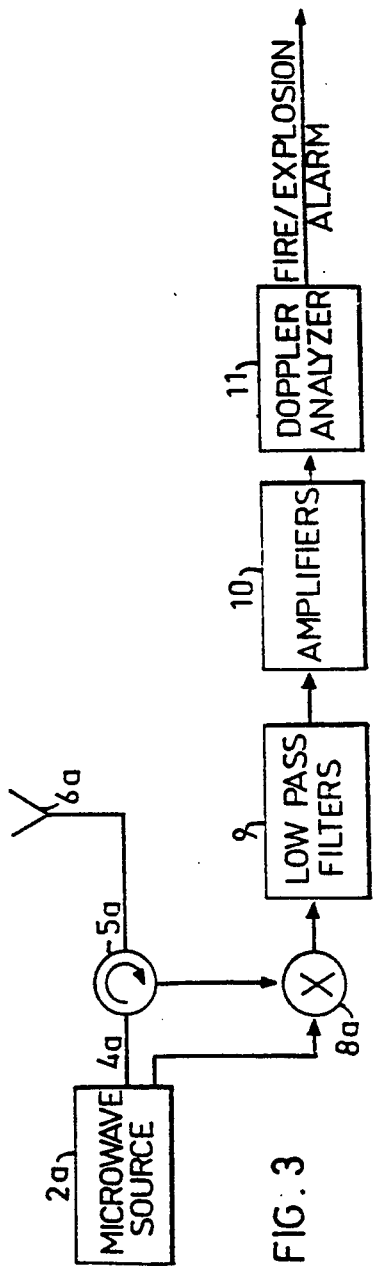

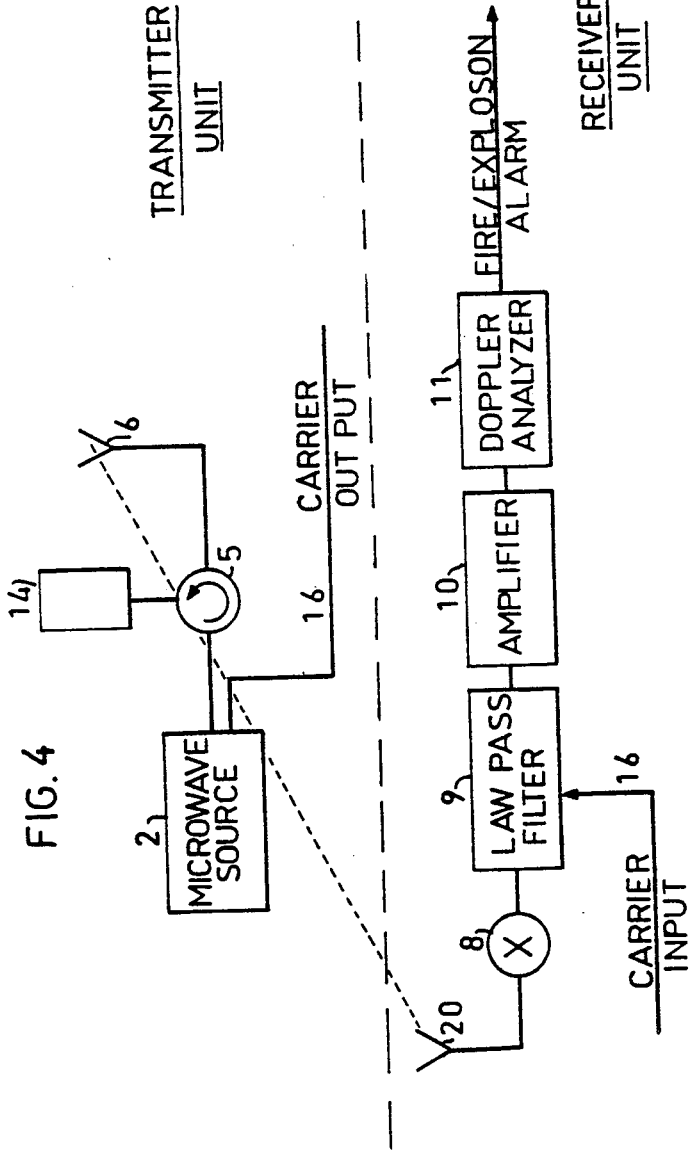
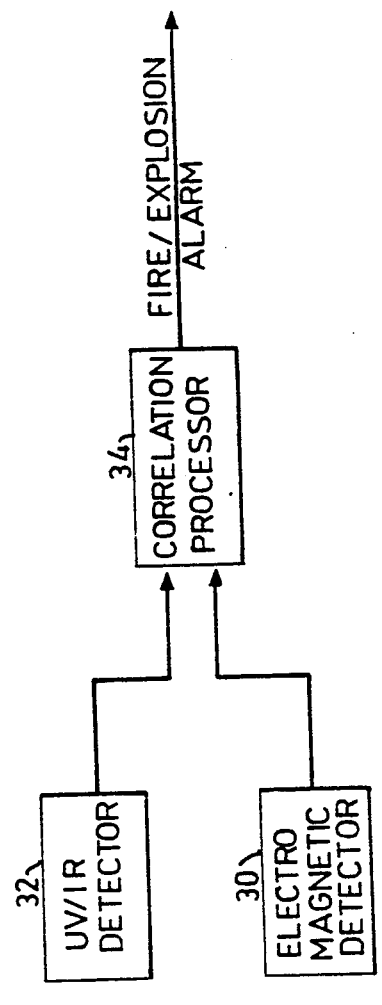
FIG. 4
FIG. 5

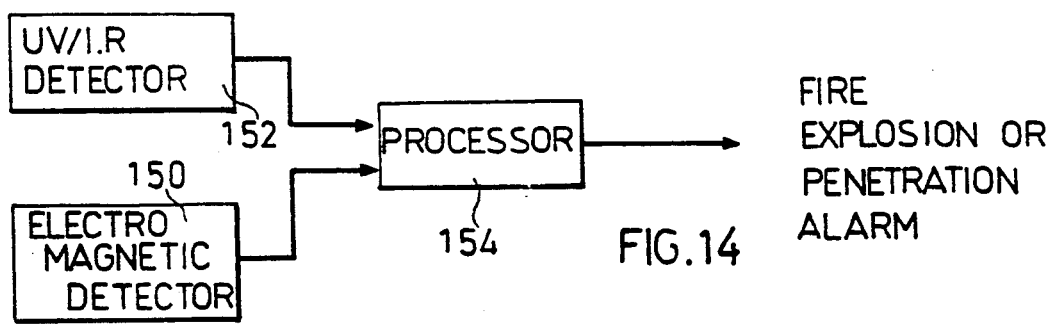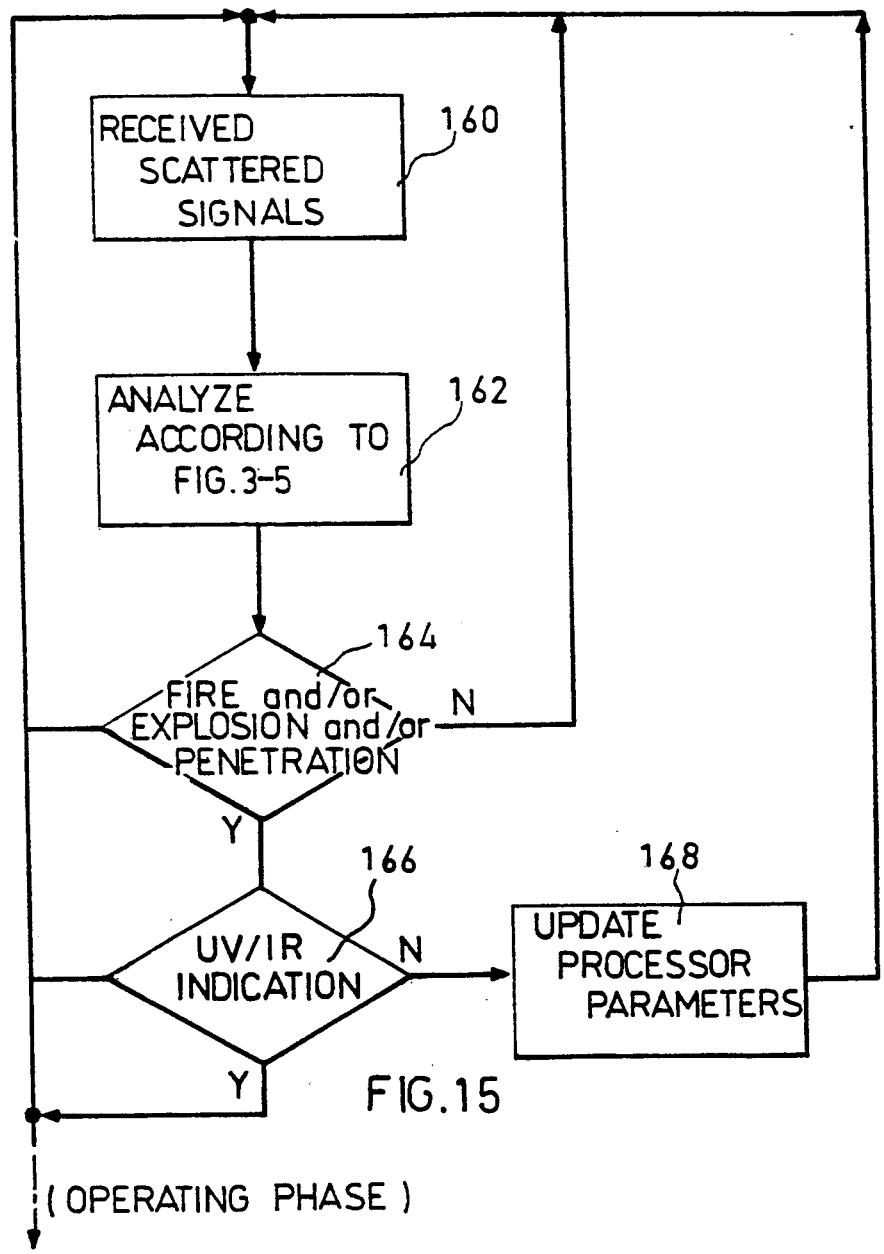

METHOD AND APPARATUS FOR DETECTING FIRE, EXPLOSION, AND/OR PROJECTILE PENETRATION

FIELD AND BACKGROUND OF THE INVENTION

The present invention relates to a method and apparatus for detecting the occurrence of a fire or of an explosion (the latter expression as used herein includes detonation), and/or the penetration of a projectile through a barrier, in a monitored space. The invention also relates to a method and apparatus for distinguishing between the above.

Many types of fire and/or explosion detectors are available today, such as: smoke detectors, temperature detectors, infrared detectors, ultraviolet detectors, and various combinations of such detectors. In general, such fire and/or explosion detectors have limited performance with respect to discriminating between fire and explosion, rate of false alarms, range of operation particularly operation out of the line of sight, and maintenance requirements.

OBJECTS AND BRIEF SUMMARY OF THE INVENTION

An object of the present invention is to provide a novel method and apparatus for detecting the occurrence of a fire or of an explosion, having improved performance in one or more of the above respects. Another object of the invention is to provide a method and apparatus for distinguishing between a fire and an explosion. A further object is to provide a method and apparatus for detecting the penetration of a projectile through a barrier.

The present invention is based on the known phenomenon that fire behaves as a plasma, namely as a body of ionized gas having high concentrations of ionized particles. For example, a "fire plasma" is a body of ionized gas having typical concentrations of $10^{10}$ to $10^{13}$ ionized particles per cc of fire at standard temperature and pressure. An explosion produces a more intense "fire plasma", i.e., having a higher temperature and a higher concentration of ionized particles, the latter sometimes reaching several orders of magnitude higher than in a "fire plasma". Plasma interacts with electromagnetic radiation in the radio frequency (RF) and microwave region and causes attenuation, scattering, refraction, and frequency (Doppler) shifts in the electromagnetic radiation. These interactions are exploited in the method and apparatus of the present invention in order to detect the occurrence of a fire or an explosion, and also to distinguish between a fire and an explosion.

Every plasma has a specific frequency, called a "plasma frequency"; typically between 500 and 890 MHz. In most cases other than in plasmas, the interaction with RF electromagnetic radiation increases with an increase in the frequency. Thus, best radar echoes are produced at the higher RF frequencies. In the case of a plasma, however, this interaction is in the opposite sense, i.e., it increases with lower RF frequencies below the plasma frequency. Thus, the attenuation, scattering and refraction produced by a plasma is much stronger at the lower RF frequencies than at the higher RF frequencies. This phenomenon is also exploited in the present invention.

A further phenomenon exploited in the present invention is that a frequency shift, hereinafter called a Doppler shift, is produced in the scattered electromagnetic radiation by the fire or explosion turbulence. Thus, in a fire or explosion turbulence, different parts of the plasma are moving in different radial velocities, either towards the original RF wave or away from it, and therefore the Doppler spectrum produced contains many positive and negative shifts simultaneously compared to the original RF frequency. Accordingly, whereas most objects in motion will produce either positive or negative Doppler shifts, depending on whether the object is moving towards or away from the RF wave, in the case of a fire or an explosion the Doppler spectrum contains both positive and negative shifts simultaneously.

Further, in the case of an explosion (or detonation), the temperature, electron density and plasma velocity increase more sharply than in the case of a fire. Therefore an explosion or detonation causes a sharper increase in the scattering of the electromagnetic wave and of the Doppler shifts. Moreover, the plasma frequency also increases in the case of an explosion. These phenomena are also exploited in the present invention to distinguish between the occurence of fire on the one hand, and the occurrence of an explosion on the other hand.

According to the present invention, there is provided a method of detecting the occurrence of a fire or an explosion in a monitored space, comprising the steps: transmitting to the space an electromagnetic signal of at least one radio frequency; receiving the transmitted signal as scattered by the space; and analyzing at least one parameter of the received signal to produce an indication whether a fire or explosion has occurred in the space.

According to a further feature in the preferred embodiments of the invention described below, the analyzing step may also include analyzing the rate of change of the parameter, to indicate an explosion when a high rate of change is found, and a fire when a lower rate of change is found.

According to still further features in the preferred embodiments of the invention described below, the parameter analyzed may be the magnitude and/or the Doppler shifts of the received signal. Preferably, two electromagnetic signals of different radio frequencies are transmitted and analyzed to provide an indication of the occurrence of a fire or an explosion. For example, two radio frequencies could be alternately transmitted, received and analyzed. Preferably, one frequency is below the "plasma frequency" (890 MHz), e.g., about 700 MHz, and the other is above the "plasma frequency", e.g., 5-35 GHz. If the magnitude of the received signal is larger for the lower RF signal, this would indicate the occurrence of either a fire or an explosion since the plasma produced thereby has a stronger scattering effect on the transmitted RF signal of lower frequency than on that of the higher frequency, thereby producing a stronger received signal at the lower frequency than at the higher frequency.

One or both of the received signals could also be analyzed for Doppler shifts to indicate, by the presence of both positive and negative Doppler shifts, the occurrence of either a fire or an explosion. The rate of change of the magnitude of e.g., the lower frequency received signal, could also be analyzed, and if the rate of change is higher than a predetermined threshold, this would indicate that the occurrence was an explosion rather than a fire.

According to further described embodiments, the invention may exploit the further phenomenon that the penetration of a projectile through a barrier also produces a "plasma" in which the plasma density and velocity increase even more sharply than in the case of an explosion. That is to say, the plasma density in the case of a fire ($d_1$) is much less than the plasma density in the case of an explosion ($d_2$), which in turn is much less than the plasma density in the case of the penetration of a projectile through a barrier ($d_3$); i.e., $d_1 < d_2 < d_3$. The plasma velocities for the above three conditions have a similar relationship, i.e., $v_1 < v_2 < v_3$.

Therefore, the Doppler signal magnitudes ($S_1$, $S_2$, $S_3$), the rate of change ($S_1/t$, $S_2/t$, $S_3/t$), and the frequency shifts $FS_1$, $FS_2$, $FS_3$, for the above three cases are related in the same manner; that is:

$$S_1 < S_2 < S_3$$
$$S_1/t < S_2/t < S_3/t$$
$$FS_1 < FS_2 < FS_3$$

The latter phenomena may be exploited not only to detect the occurrence of any one of the above three conditions of fire, explosion, or projectile penetration, but also to indicate which of the three conditions has occurred in the monitored space.

Such an indication can be extremely important for different applications. For example, if only a projectile-penetration has been detected, there may be no need to activate a fire-extinguishing system. In addition, a different mode of extinguishing a fire may be called for when a projectile-penetration followed by an explosion and a fire has been detected, as compared to where a projectile-penetration followed by fire alone has been detected.

When the method is utilized in a monitored space not having moving objects, the probability of false alarms is very small; however, when the monitored space contains moving objects, e.g., a hangar where workers, vehicles and platforms are moving about, high sensitivity of the system will tend to produce a higher rate of false alarms.

According to another feature in some described embodiments, the method comprises the further steps of also detecting the magnitude of the ultraviolet or infrared radiation emitted from the monitored space; and utilizing the detected radiation, together with the analysis of the predetermined parameter of the received signal, to provide an indication whether a fire, explosion or projectile-penetration has occurred.

The invention also provides apparatus for implementing the above methods.

The method and apparatus of the present invention may be implemented according to different degrees of sophistication, depending on the trade-off of false-alarm rate on the one hand, and cost on the other hand. Thus, the most sophisticated system could include transmitting signals of two different frequencies and analyzing the received scattered signals with respect to magnitude and Doppler shifts, together with detected infrared or ultraviolet radiation to indicate a fire or an explosion, and also with respect to the rate-of-change in magnitude of the received scattered signals to distinguish between a fire and an explosion; such systems would be characterized by a relatively low rate of false alarms but also by a higher cost. On the other hand, the novel method and apparatus could be implemented in a much lower cost system, but also one which would have a higher rate of false alarms, by transmitting only a single frequency and analyzing the received signal only with respect to positive and negative Doppler shifts to indicate either a fire or an explosion, and with respect to the rate-of-change in magnitude of the received signal to distinguish between a fire and an explosion.

Further features and advantages of the present invention will be apparent from the description below.

BRIEF DESCRIPTION OF THE DRAWINGS

The invention is herein described, by way of example only, with reference to the accompanying drawings, wherein:

FIGS. 1-4 are block diagrams illustrating four systems constructed in accordance with the present invention for detecting fire or explosion;

FIG. 5 is a block diagram illustrating an integrated system including one of the systems of FIGS. 1-4 together with a known ultraviolet or infrared detector system for detecting fire or explosion;

FIG. 14 is a an integrated electromagnetic and optical detector for minmizing false alarms particularly when the system is used in a monitored space having moving objects; and FIG. 15 is a flow diagram illustrating the operation of the integrated system of FIG. 14 during a learning phase in order to reduce false alarms caused by moving objects in the monitored space.

DESCRIPTION OF PREFERRED EMBODIMENTS

Figure 2:
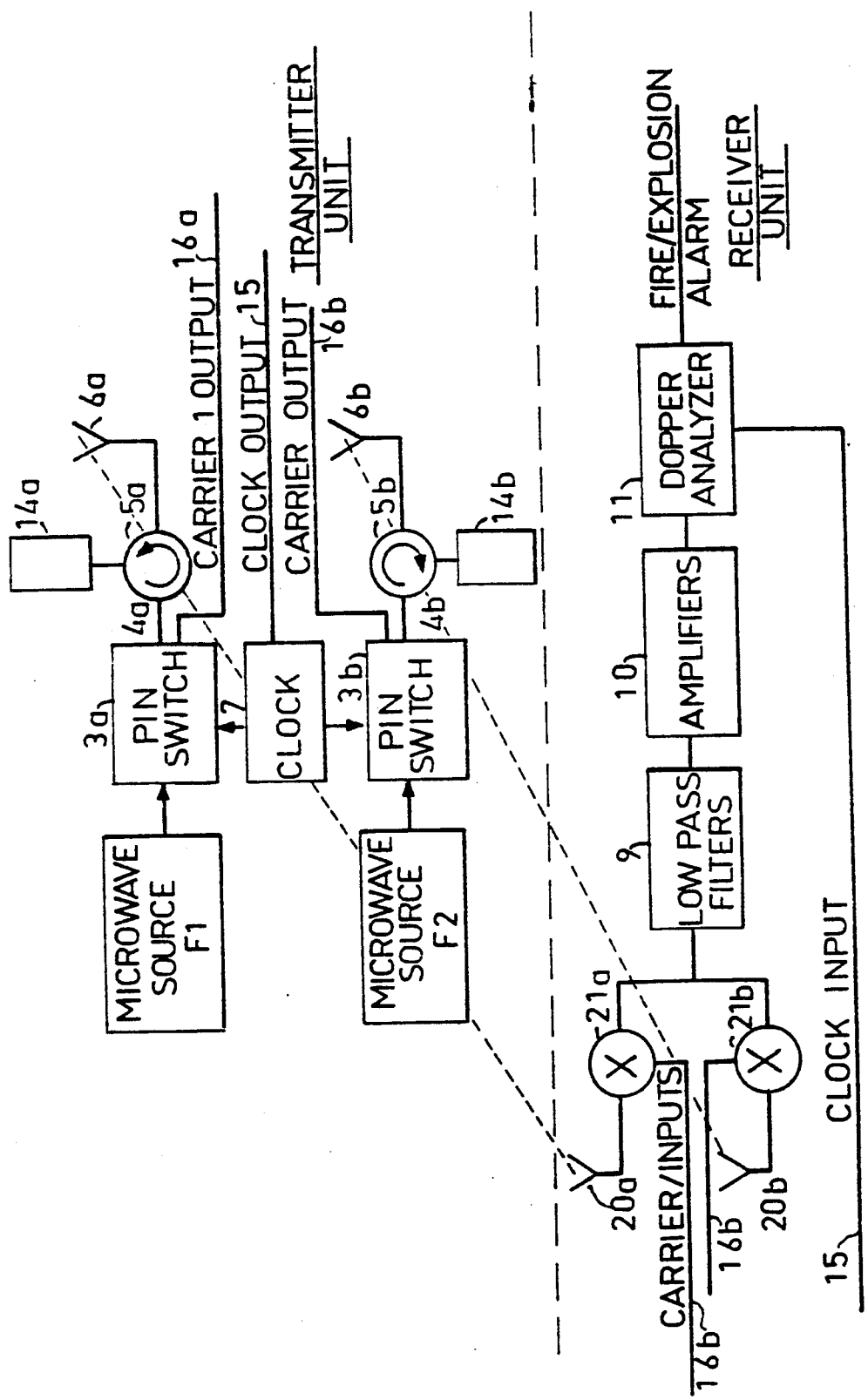

FIG. 1 illustrates one form of fire and/or explosion detector system constructed in accordance with the present invention. The system illustrated in FIG. 1 is a monostatic system; i.e., it includes transmitters and receivers in the same unit to be used at the same location.

Thus, the system illustrated in FIG. 1 comprises a transmitter including a microwave source 2a of frequency $f_1$ and a microwave source 2b of frequency $f_2$. Each source is controlled by a PIN switch 3a, 3b, respectively, for feeding its microwave signal via a coupler 4a, 4b and a circulator 5a, 5b to a transmitting-/receiving antenna 6a, 6b. The two switches 3a, 3b are alternately actuated by signals from a clock 7. The couplers 4a, 4b also feed samples of the original signals from sources 2a, 2b to mixers 8a, 8b, wherein such samples are mixed with the signals received by the antenna 6a, 6b and routed to the mixers via the circulators 5a, 5b. The circulators 5a, 5b, in addition to routing the returned signals to the mixers, also isolate or buffer the sources from the antennas 6a, 6b.

The mixers 8a, 8b are in the receiver section of the apparatus. This section also includes lowpass filters 9, amplifiers 10, and a signal analyzer 11. Thus, the original signals sampled by the couplers 4a, 4b are mixed with the signals received by the antenna 6a, 6b to produce a Doppler beat signal according to the Doppler or frequency shifts in the received signals as compared to the transmitted signals. The Doppler shift signals are filtered by the lowpass filters 9 and are amplified by the amplifiers 10, and then analyzed by the Doppler analyzer 11 to determine whether a fire and/or explosion has occurred. The filters 9 and amplifiers 10 include two channels, one being narrow band for fire detection, and the other being wide band for explosion detection.

The Doppler signal analyzer 11 includes a processor which may be operated according to any one of three modes, as will be described more particularly below with respect to the flow diagrams of FIGS. 6–8, to determine the occurrence of either a fire and/or an explosion, and also to distinguish between a fire and an explosion.

FIG. 2 illustrates a bistatic system, wherein the transmitter section and the receiver section are packaged in separate units at different locations. Thus, the transmitter section of the system of FIG. 2 includes basically the same components as described above with respect to FIG. 1 (and therefore identified by the same reference numerals to facilitate understanding), except that the circulators 5a, 5b in FIG. 2 are connected to loads (e.g., 50 ohm loads) 14a, 14b, instead of to the mixers 8a, 8b of the receiver circuit. In addition, the clock 7, which alternately operates the PIN switches 3a, 3b, outputs a clock signal via line 15, and the couplers 4a, 4b output samples of the two RF sources via lines 16a, 16b, all connected to the input circuit of the remotely-located receiver unit.

Thus, the receiver unit shown in FIG. 2 includes two receiving antennas 20a, 20b, which receive the RF signals after their interaction with the space being monitored for the occurrence of a fire or an explosion. These received signals are fed to mixers 21a, 21b, together with the samples of the RF sources 2a, 2b applied via line 16a, 16b, to produce output signals representing the Doppler shifts. These latter signals are fed to the lowpass filters 9, amplifiers 10, and Doppler signal analyzer 11, which functions as described above in FIG. 1, and to be described more particularly below with respect to the flow diagram of FIGS. 6–8.

The main difference between the systems of FIGS. 1 and 2 is that in the monostatic system of FIG. 1, the signals produced by scattered radiation are received at the same angle as the incident wave, whereas in the bistatic system of FIG. 2, the scattered radiation is received from different angles. The bistatic system may be particularly useful in certain applications such as fire detection inside pipes and ducts.

FIG. 3 illustrates a monostatic system involving only a single frequency, rather than two frequencies. Thus, the system illustrated in FIG. 3 includes the same components as in one channel of the transmitter section, and in the common channel of the receiver section, as in the monstatic system of FIG. 1; these elements are correspondingly numbered as in FIG. 1 to facilitate understanding.

FIG. 4 illustrates a bistatic system also involving only a single frequency. It includes the same components as in one channel of the transmitter section, and in the common channel of the receiver section, as in the bistatic system of FIG. 2, which elements are therefore also correspondingly numbered to facilitate understanding.

FIG. 5 is a block diagram illustrating an integrated system including both an RF fire/explosion detector generally designated 30, which may be according to any one of FIGS. 1–4, and an optical detector 32 for detecting ultraviolet and/or infrared radiation. The output of the RF detector 30 is fed, together with the output of the optical detector 32, to a correlation processor 34 which effects a cross-correlation analysis of the latter inputs to make a decision whether a fire and/or an explosion has been detected.

Figure 6:
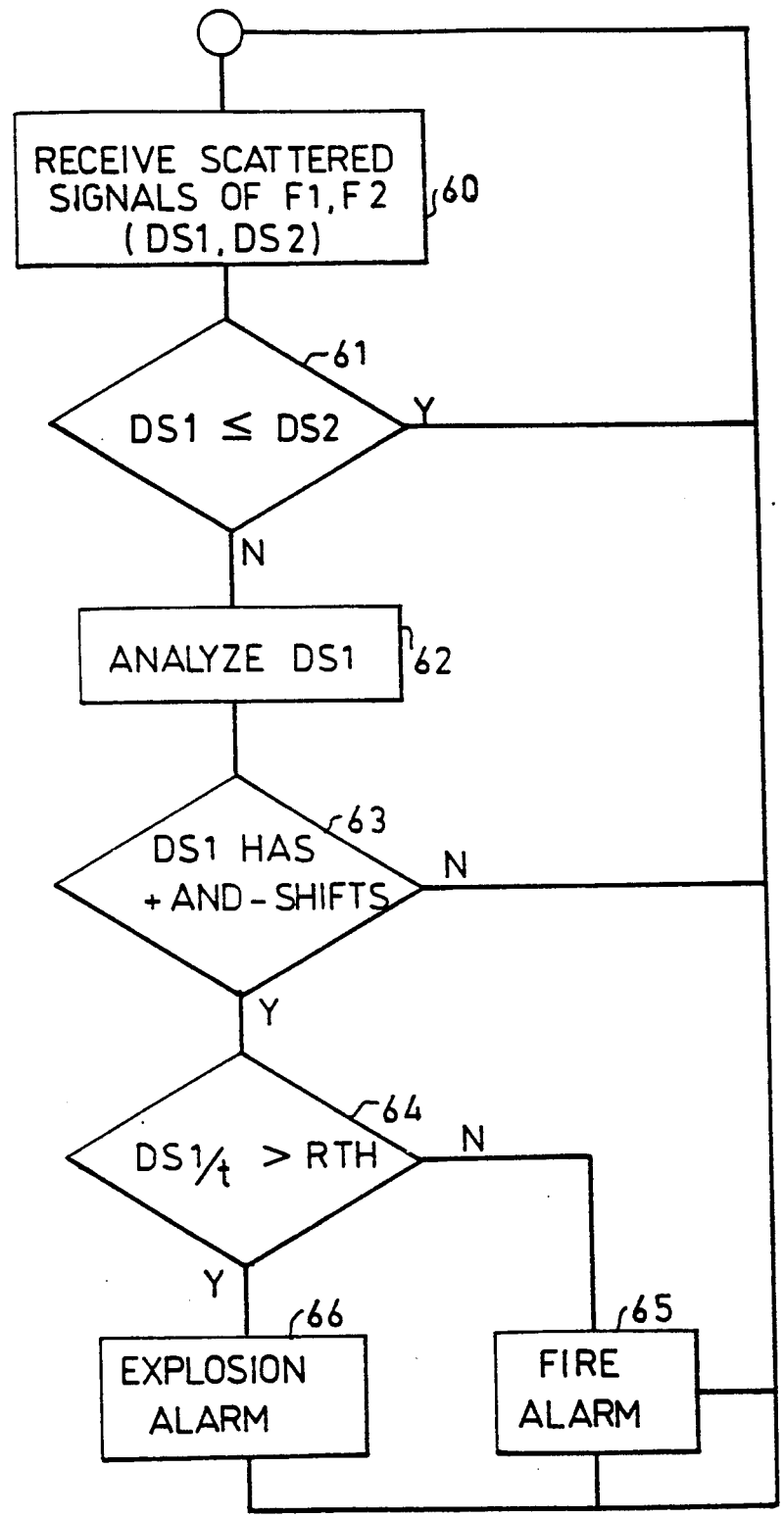
FIGS. 6-8 are flow diagrams illustrating three different modes of operation of the received signal analyzer in any of the systems of FIGS. 1-5.
Figure 7:
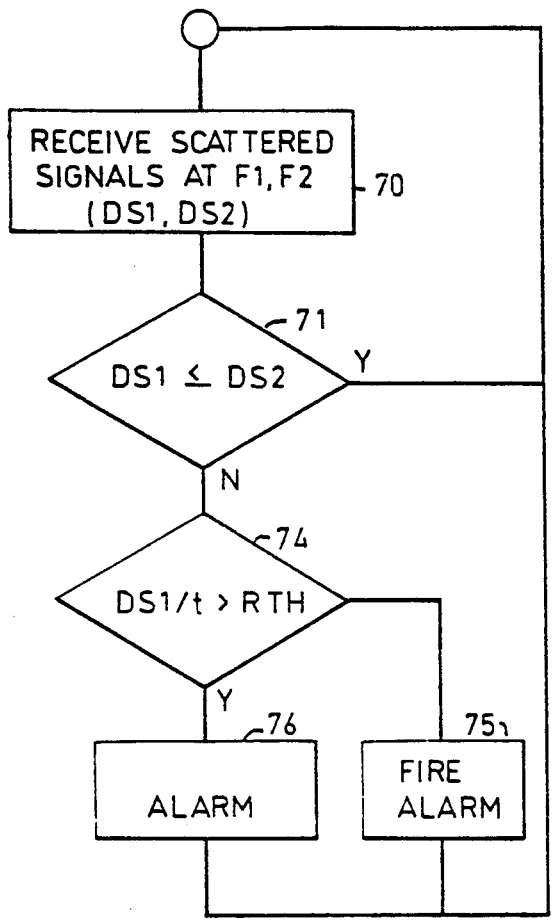
Figure 8:
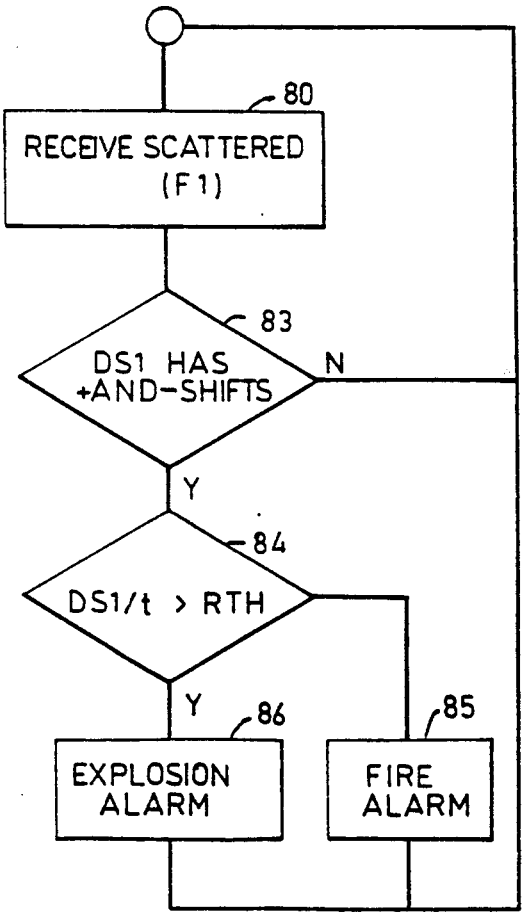

FIGS. 6 and 7 are flow charts illustrating two operations of the Doppler signal analyzer 11 in the two-frequency monostatic system of FIG. 1 or bistatic system of FIG. 2; whereas FIG. 8 is a flow chart illustrating the operation of the Doppler signal analyzer in the single-frequency systems of FIGS. 3 or 4.

The system illustrated by the flow chart of FIG. 6 is the most sophisticated one of those illustrated, and therefore would be characterized by a lower rate of false alarms but also by higher cost. According to this system, the Doppler signal analyzer (e.g., block 11, FIG. 1) includes a processor which is programmed to perform the following operations:

The received scattered signals at frequencies $f_1$, $f_2$ (block 60) are compared in magnitude to determine whether the magnitude of the received signal $DS_1$ of the lower frequency ($f_1$) is less than the magnitude of the received signal ($DS_2$) of the higher frequency ($f_2$) (block 61); if so, this indicates that a greater scattering was effected by the monitored space of the higher frequency transmitted signal ($f_1$), which is not a characteristic of a fire or explosion plasma, as described earlier. Accordingly, if the decision in block 61 is positive, this indicates no fire or explosion in the monitored space, and the program returns to the beginning; but if the decision in block 61 is negative, this indicates that there was either a fire or an explosion (but does not yet distinguish between the two) in the monitored space.

The processor then analyzes the larger of the received signals ($DS_1$) for Doppler shifts (block 62); and determines whether such signals have both positive and negative Doppler shifts (block 63). Since a fire or explosion produces a turbulence in which the plasma moves in different radial velocities, either towards or away from the transmitted signal as described above, a fire or explosion would produce both positive and negative Doppler shifts. Accordingly, if both positive and negative Doppler shifts are not detected, decision block 63 would make a determination that there is no fire fire or explosion, thereby reducing the possibility of false alarms.

However, if both positive and negative Doppler shifts are detected indicating either a fire or an explosion, the processor in the Doppler analyzer 11 then makes the determination indicated in block 64, namely whether the rate of change of the magnitude of the received signal ($DS_1/t$) is greater than a predetermined threshold rate ($R_{TH}$). If the decision is negative, this would indicate the occurrence of a fire, and therefore a fire alarm 65 would be actuated; but if the decision is positive, this would indicate the occurrence of an explosion, and an explosion alarm 66 would be actuated.

It will thus be seen that the processor included in the Doppler analyzer (e.g., block 11, FIG. 1) makes two separate checks to determine whether or not either a fire or an explosion has occurred, namely checking the respective magnitudes of the received signals (block 61), and also checking for the presence of both positive and negative Doppler shifts in the larger of the two received signals (block 63). If a fire or explosion has been determined to have occurred, then the processor determines whether the occurrence was a fire or an explosion by analyzing the rate of change of the received Doppler signal ($DS_1$), since a high rate of change in the magnitude of that signal indicates an explosion, whereas a lower rate of change indicates a fire.

FIG. 7 illustrates a somewhat simplified operation for the processor in the Doppler analyzer (e.g., block 11, FIG. 1), but still using transmitted signals of two frequencies ($f_1$, $f_2$). Actually, flow chart FIG. 7 illustates all the operations described above with respect to FIG. 6, except the determination made in decision block 63 of FIG. 6, namely whether there are both positive and negative Doppler shifts. The operations illustrated in FIG. 7 which are common to those illustrated in FIG. 6 are correspondingly numbered, except using numers in the "70" series, to facilitate understanding.

Thus, the flow chart of FIG. 7 also includes an action operation to receive the scattered signals at frequencies $f_1$, $f_2$ (block 70), and a decision operation to determine whether $DS_1$ is less than $DS_2$ (block 71) and thereby to determine whether a fire or an explosion has occurred in the monitored space. If a fire or explosion is indicated to be present, the processor then makes a decision operation (block 74) to determine whether $DS_1/t$ is greater than a predetermined threshold rate, and thereby to distinguish between a fire (block 75) and an explosion (block 76).

Since the operation according to the flow chart illustrated in FIG. 7 does not make a determination of whether or not there are both positive and negative Doppler shifts in the received signal being analyzed (corresponding to block 63 in FIG. 6), it would therefore be expected to have a higher rate of false alarms than the operation described with respect to FIG. 6.

FIG. 8 illustrates an operation similar to that of FIG. 6 but transmitting only a single frequency ($f_1$) to the monitored space. Accordingly, the flow chart of FIG. 6 does not include the operations indicated by blocks 61 and 62 in FIG. 6, but does include the operations indicated by the remaining blocks 63, 64, 65 and 66 of FIG. 6, and have been correspondingly numbered as blocks 83, 84, 85 and 86, respectively, in FIG. 8.

Since the operations illustrated by the flow chart of FIG. 8 does not include a comparison of the magnitude of the received Doppler signals at the two transmitted frequencies (blocks 61, 62, FIG. 6), the FIG. 8 operation will also be expected to have a higher rate of false alarms than the system illustrated in FIG. 6, but would be considerably less expensive because only one frequency is transmitted and analyzed, rather than two frequencies.

In order to even further reduce the rate of false alarms, the integrated system illustrated in FIG. 5 may be used, wherein both an RF detector (of any of the above-described types and operating according to any of the above-described flow charts) is included in combination with an optical detector (32) for detecting ultraviolet and/or infrared radiation, as described above with respect to FIG. 5.

The radio frequency f or $f_1$ in all the above-described embodiments is in the microwave region below 890 MHz, preferably between 500 and 890 MHz. When a second frequency is also used ($f_2$), it is preferably above 890 MHz but no more than about 35 GHz. Particularly good results have been obtained when $f_1$ is about 700 MHz, and $f_2$ is about 9 GHz.

Figure 9:
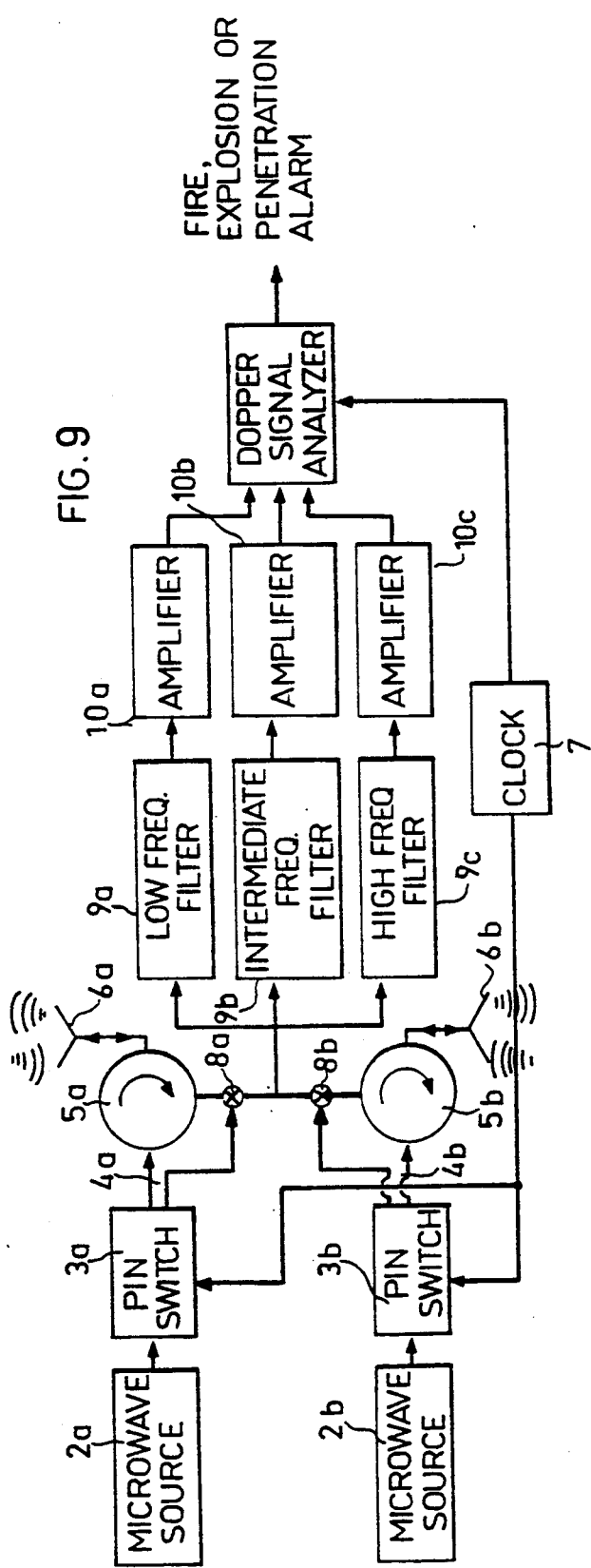
FIG. 9 is a block diagram illustrating another system constructed in accordance with the present invention for detecting, and discriminating between, a fire, explosion or a penetration of a projectile through a barrier.

The system illustrated in FIG. 9 is similar to that illustrated in FIG. 1, except that it has been modified to enable the system to detect, in addition to fire and an explosion, also the penetration of a projectile through a barrier, e.g., a tank wall, and further, to discriminate between the above three occurrences. To facilitate understanding, the same components as are present in FIG. 1 generally carry the same reference numerals in FIG. 9.

Thus, the system illustrated in FIG. 9 comprises a transmitter including a microwave source 2a of frequency $f_1$ and a microwave source 2b of frequency $f_2$. Each source is controlled by a PIN switch 3a, 3b, respectively, for feeding its microwave signal via a coupler 4a, 4b and a circulator 5a, 5b to a transmitting-/receiving antenna 6a, 6b. The two switches 3a, 3b are alternately actuated by signals from a clock 7. The couplers 4a, 4b also feed samples of the original signals from sources 2a, 2b to mixers 8a, 8b, wherein such samples are mixed with the signals received by the antenna 6a, 6b and routed to the mixers via the circulators 5a, 5b. The circulators 5a, 5b, in addition to routing the return signals to the mixers, also isolate or buffer the sources from the antennas 6a, 6b.

The mixers 8a, 8b are in the receiver section of the apparatus. This section also includes filters 9a-9c, amplifiers 10a-10c, and a Doppler signal analyzer 11. Thus, the original signals sampled by the couplers 4a, 4b are mixed with the signals received by the antenna 6a, 6b to produce a Doppler beat signal according to the Doppler or frequency shifts in the received signals as compared to the transmitted signals.

Figure 10:
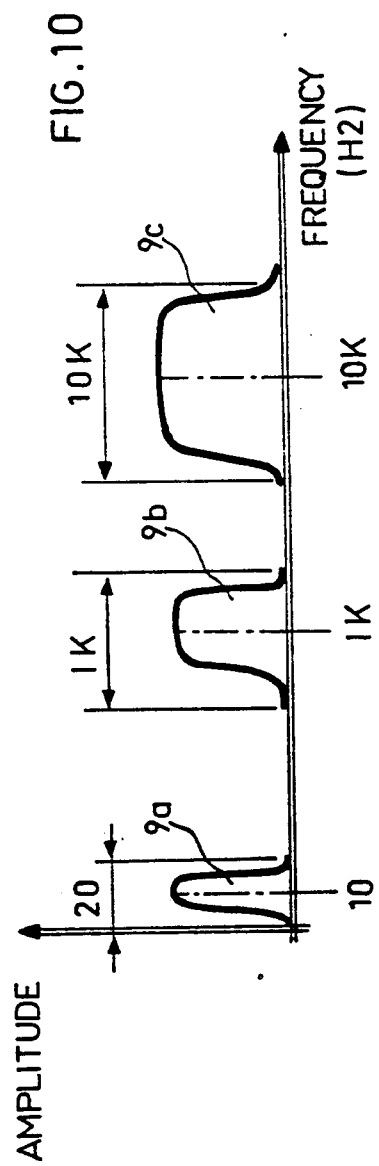
FIG. 10 illustrates the relative frequency responses of the three parallel filters used in the system of FIG. 8.

In the system illustrated in FIG. 1, the receiver included a single lowpass filter 9 having two channels, namely a narrow band for fire detection, and a wide band for explosion detection. In the system of FIG. 9, however, there are three filters 9a, 9b, 9c, respectively, all connected in parallel, having relative frequency responses as shown for example in FIG. 10. Thus, filter 9a is a lowpass filter for passing a low-frequency component in the order of 10 Hz, and has a bandwidth of about 20 Hz; filter 9b is an intermediate-frequency filter with center frequency in the order of 1 KHz, and has a bandwidth of about 1 KHz; and filter 9c is a relatively higher-frequency filter with a center frequency in the order of 10 KHz, and has a bandwidth of about 10 KHz.

Figure 11:
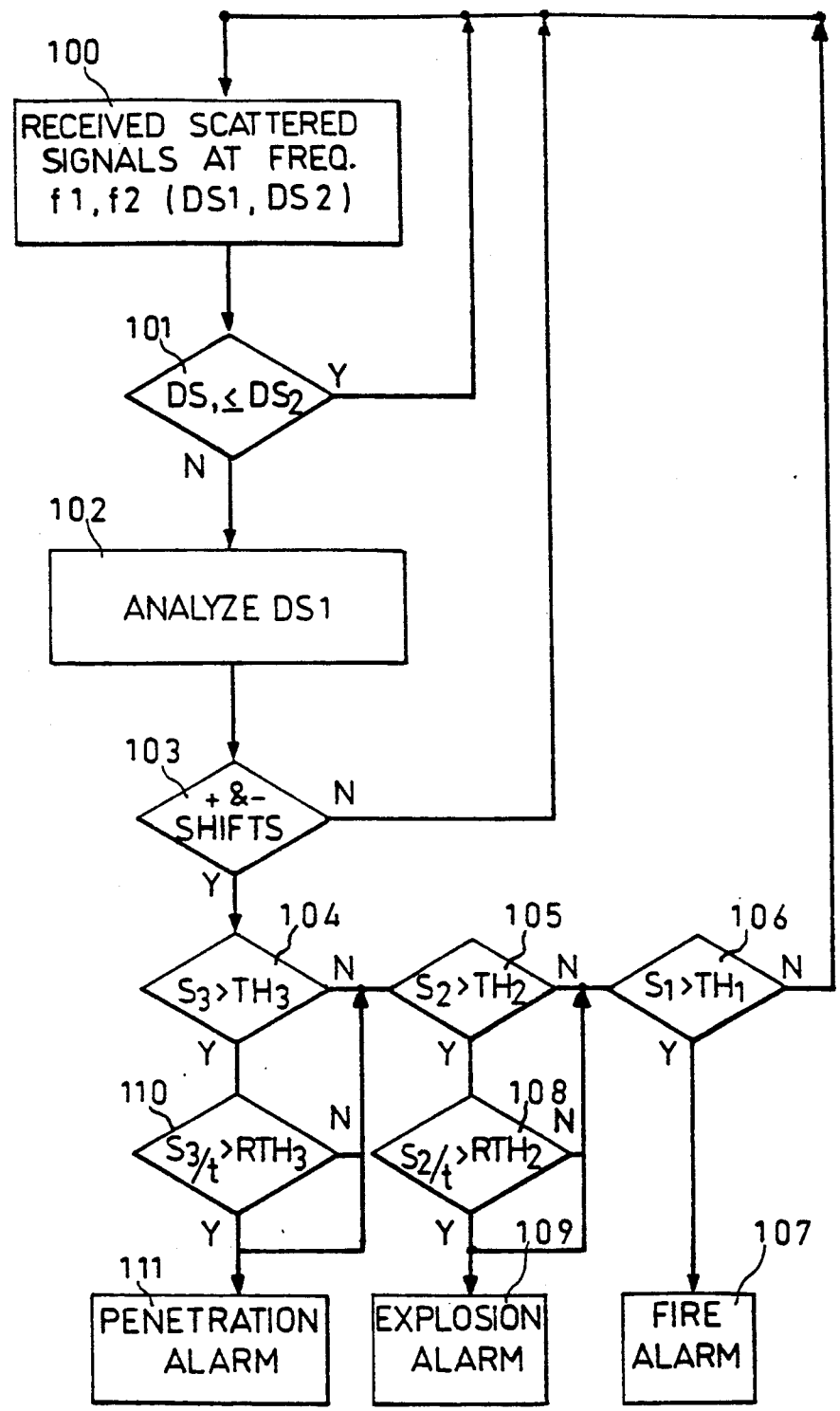
FIGS. 11-13 are flow diagrams illustrating three different modes of operation of the received signal analyzer in the system of FIGS. 9 and 10.
Figure 12:
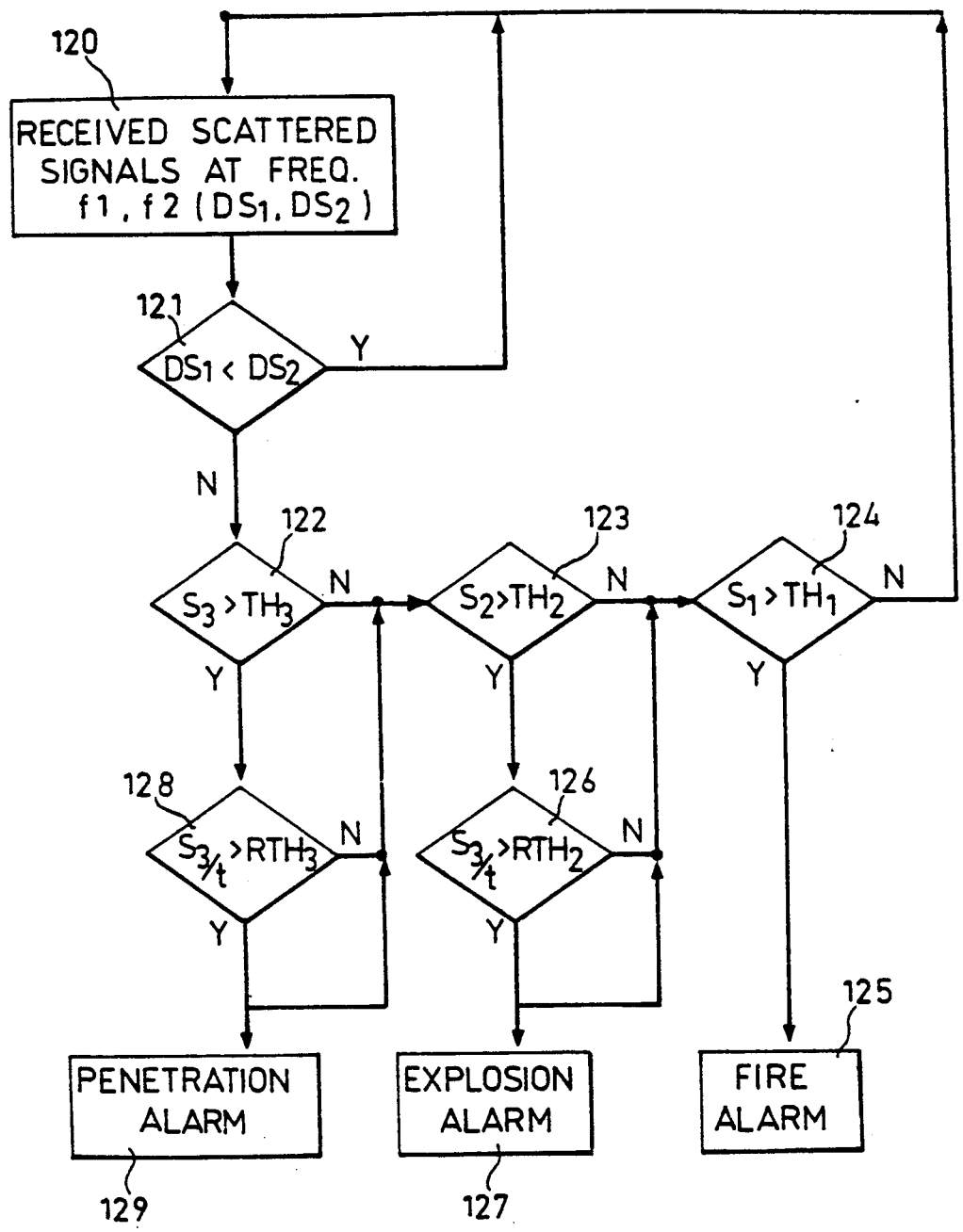
Figure 13:
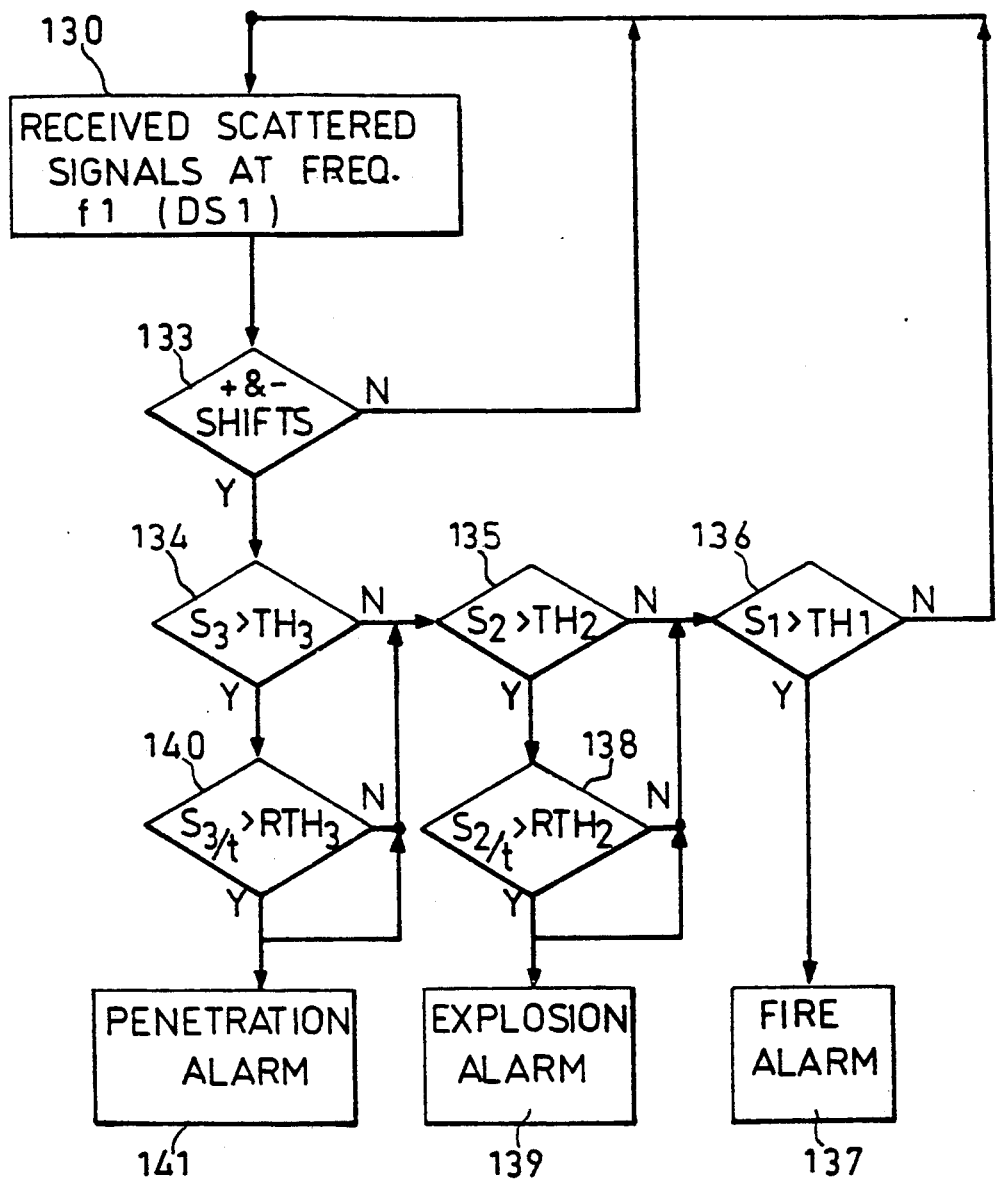

These three frequency components of the received signal ($S_1$, $S_2$, $S_3$), after amplification in their respective amplifiers 10a-10c, are analyzed by the Doppler analyzer 11, which performs threshold and spectrum analysis according to any one of the three modes of operation illustrated by the flow charts of FIGS. 11, 12 and 13, respectively, depending on the acceptable cost and false-alarm rate for the particular application.

Thus, FIG. 11 illustrates a mode of operation similar to that of FIG. 6 but modified to enable the system also to indicate the occurrence of a penetration of a projectile through a barrier, in addition to the occurrence of a fire or explosion. According to this system, the Doppler signal analyzer 11, FIG. 9, includes a processor which is programmed to perform the following operations:

The received scattered signals at frequencies $f_1$, $f_2$ (block 100) are compared in magnitude to determine whether the magnitude of the received signal $DS_1$ of the lower frequency ($f_1$) is less than the magnitude of the received signal ($DS_2$) of the higher frequency ($f_2$)

(block 101); if so, this indicates that a greater scattering was effected in the monitored space of the higher frequency transmitted signal ($f_2$); this is not a characteristic of a plasma created by a fire, explosion, or projectile-penetration. Accordingly, if the decision in block 101 is positive, this indicates that none of the foregoing conditions has occurred and the programme returns to the beginning; but if the decision in block 101 is negative, this indicates that one of the above three conditions has occurred, in the monitored space, but does not distinguish between them to indicate which of the three conditions has actually occurred.

The processor then analyzes the larger of the received signals ($DS_1$) for Doppler shifts (block 102), and determines whether such signals have both positive and negative Doppler shifts (block 103). Since all three of the above conditions produce a turbulence in which the plasma moves at different radial velocities and in different radial directions towards or away from the transmitted signal, the occurrence of one of the above three conditions would produce both positive and negative Doppler shifts. Accordingly, if both positive and negative Doppler shifts are not detected, decision block 103 makes a determination that none of the above three conditions has occurred, and the programme returns to the beginning.

However, if both positive and negative Doppler shifts are detected, the processor then performs a threshold and spectrum analysis of the Doppler shift signal $DS_1$. Thus, it determines whether the high-frequency component ($S_3$) separated by filter 9c (FIG. 9) is above a predetermined threshold $TH_3$ (block 104); if not, it determines whether the intermediate-frequency component ($S_2$) separated by filter 9b is above a predetermined threshold $TH_2$ (block 105); and if not, it determines whether the low-frequency component ($S_1$) separated by filter 9a, is above a predetermined threshold $TH_1$ (block 106). If this determination is also negative, this indicates that none of the above three conditions has occurred, and the programme therefore returns to the beginning. On the other hand, if the determination in block 106 is positive, this indicates that a fire has occurred, and the fire alarm 107 is energized.

On the other hand, if the determination in block 105 is positive, Doppler signal analyzer 11 then makes a determination of whether the rate of change of the Doppler shift of the intermediate-frequency component ($S_2/t$) is above a predetermined threshold ($RTH_2$); if the determination in block 108 is positive, this indicates that an explosion has occurred, and the explosion alarm 109 is energized.

If the determination in block 104 was positive, Doppler signal analyzer 11 (FIG. 9) then makes a determination (block 110) of whether the rate of change of the high-frequency component of the Doppler shift ($S_3/t$) is greater than a predetermined threshold ($RTH_3$); if so, this indicates that the condition was a penetration of a projectile through a barrier, and therefore a penetration alarm 111 is energized.

FIG. 12 illustrates a somewhat simplified operation for the processor in the Doppler signal analyzer 11 of FIG. 9, comparable to the operation illustrated in FIG. 7 but modified to enable the processor also to detect and indicate the occurrence of the penetration of a projectile through a barrier in the monitored space.

Thus, the flow chart of FIG. 12 also includes an action operation to receive the scattered signals at frequencies $F_1$, $F_2$ (block 120), and a decision operation to determine whether $DS_1$ is less than $DS_2$ (block 121). A positive determination by block 121 indicates that none of the above three conditions has occurred, and the processor then returns to the beginning, whereas a negative determination by block 121 indicates that one of the three above conditions has occurred. .The processor then proceeds to make the same threshold and spectrum analysis, and to energize the respective alarm, as illustrated in blocks 122–129, and as described above in FIG. 11 with respect to blocks 104–111.

FIG. 13 illustrates an operation similar to that of FIG. 11 but transmitting only a single frequency ($f_1$) to the monitored space (130). Accordingly, the flow chart of FIG. 13 does not include the operations indicated by blocks 101 and 102 in FIG. 11, but does include the operations indicated by the remaining blocks 103–111, which have been correspondingly numbered as blocks 133–141 in FIG. 13.

For the sake of simplifying the present description, only one of the several systems described earlier with respect to FIGS. 1–8 is illustrated herein, namely the system of FIG. 1. However, it will be appreciated that the modification of FIG. 9 could include any of the systems of FIGS. 1–8.

FIG. 14 is a block diagram illustrating an integrated system, including both an RF fire/explosion/projectile-penetration detector, generally designated 150, and an optical detector 152 for detecting ultraviolet and/or infrared radiation. The output of the RF electromagnetic wave detector 150 is fed, together with the output of the optical detector 152, to a processor 154, which processor may operate according to the mode illustrated by the flow chart in FIG. 15 to minimize false alarms, particularly by moving objects in the monitored space. This is done by operating the integrated detector in two phases, namely a learning phase, and an operating phase.

FIG. 15 illustrates the learning phase, wherein the scattered RF signals are received (block 160), and analyzed according to any of the operations illustrated in FIGS. 11–13 (block 162). If the electromagnetic wave detector (152, FIG. 14) detects a fire, explosion, or projectile-penetration, then the UV/IR detector 150 is used for detecting whether a fire has occurred (block 166), and if not, it updates (168) the processor with respect to the Doppler processor thresholds, time constants, and frequency discriminators so as to adapt the system not to respond to moving objects.

When during the learning phase there is an indication from the electromagnetic wave detector of a fire, explosion or projectile-penetration, without a simultaneous indication from the UV/IR detector, the parameters of the electromagnetic wave detector are updated until the end of the indication. During the operating phase, an indication will be produced only if both types of detectors indicate a fire, explosion or penetration.

While the invention has been described with respect to several preferred embodiments, it will be appreciated that many other variations, modifications and applications of the invention may be made.

What is claimed is:

1. A method of detecting the occurrence of a fire or an explosion in a monitored space, comprising the steps:
    transmitting to said space an electromagnetic signal of at least one radio frequency;
    receiving the transmitted signal as scattered by said space;

analyzing at least one parameter of the received signal to produce an indication whether a fire or explosion has occurred in said space;

detecting the magnitude of ultraviolet or infrared radiation emitted from said monitored space;

and utilizing said detected magnitude of radiation, together with the analysis of said one parameter of the received signal, to provide an indication whether a fire or an explosion has occurred in said space.

2. The method according to claim 1, wherein said analyzing step also includes analyzing the rate of change of said parameter, to indicate an explosion when a high rate of change is found, and a fire when a lower rate of change is found.

3. The method according to claim 1, wherein said parameter is the magnitude of the received signal.

4. The method according to claim 1, wherein said parameter is the Doppler shifts of the received signal as compared to the transmitted signal, said analyzing step including detecting the presence of both positive and negative Doppler shifts to indicate either a fire or an explosion.

5. The method according to claim 1, wherein both the magnitude and the Doppler shifts of the received signal are analyzed, said analyzing step including detecting the presence of both positive and negative Doppler shifts in the received signal as compared to the transmitted signal to indicate either a fire or an explosion, and detecting the rate of change of the magnitude of the received signal to distinguish between a fire and an explosion.

6. A method of detecting the occurrence of a fire or an explosion in a monitored space, comprising the steps:

transmitting to said space two electromagnetic signals of different radio frequencies;

receiving the two electromagnetic signals of different radio frequencies as scattered by said space; and detecting the magnitudes of the received signals for the two radio frequencies, the occurrence of a fire or explosion being indicated when the magnitude of the received signal of the lower radio frequency is larger than the received signal of the higher radio frequency.

7. A method of detecting the occurrence of a fire or an explosion in a monitored space, comprising the steps:

transmitting to said space an electromagnetic signal of at least one radio frequency;

receiving the transmitted signal as scattered by said space;

and analyzing at least one parameter of the received signal to produce an indication whether a fire or explosion has occurred in said space;

said analyzing step including separating said at least one parameter of the received signal into:

(a) a low-frequency component which is compared to a first predetermined threshold to determine whether a fire has occurred;

(b) an intermediate-frequency component which is compared to a second predetermined threshold to determine whether an explosion has occurred; and (c) a high-frequency component which is compared to a third predetermined threshold to determine whether a penetration of a projectile through a barrier has occurred.

8. The method according to claim 7, wherein said at least one parameter of the received signal is the Doppler shifts of the received signal as compared to the transmitted signal; and the magnitude of the three components of the Doppler shifts are compared with their respective predetermined thresholds.

9. The method according to claim 7, wherein said at least one parameter of the received signal is the Doppler shifts of the received signal as compared to the transmitted signal, and the rate of change of the three components of the Doppler shifts are compared with their respective predetermined thresholds.

10. Apparatus for detecting the occurrence of a fire or an explosion in a monitored space, comprising:

a transmitter for transmitting to said space an electromagnetic signal of at least one radio frequency;

a receiver for receiving the transmitted signal as scattered by said space;

a processor including analyzer means for analyzing at least one parameter of the received signal to produce an indication whether a fire or explosion has occurred in said space;

and a detector for detecting the magnitude of ultraviolet or infrared radiation emitted from said predetermined space;

said processor including means for utilizing said detected magnitude of radiation, together with the analysis of said predetermined parameter of the received signal, to provide an indication whether a fire or explosion has occurred in said space.

11. The apparatus according to claim 10, wherein said processor also includes means for analyzing the rate of change of said parameter to distinguish between a fire and an explosion.

12. The apparatus according to claim 10, wherein said analyzer means includes a detector for detecting the magnitude of the received signal.

13. The apparatus according to claim 10, wherein said analyzer means includes means for detecting the Doppler shifts of the received signal as compared to the transmitted signal, and means for detecting the presence of both positive and negative Doppler shifts to indicate either a fire or an explosion.

14. The apparatus according to claim 10, wherein said analyzer means includes means for detecting the presence of both positive and negative Doppler shifts in the received signal as compared to the transmitted signal to indicate a fire or an explosion, and means for determining the rate of change of the magnitude of the received signal to distinguish between a fire and an explosion.

15. Apparatus for detecting the occurrence of a fire or an explosion in a monitored space, comprising:

a transmitter for transmitting to said space two electromagnetic signals of different radio frequencies;

a receiver for receiving the transmitted signals as scattered by said space;

and a processor including analyzer means for analyzing at least one parameter of the received signals to produce an indication whether a fire or explosion has occurred in said space;

said processor including means for detecting the magnitudes of the received signals for the two radio frequencies, the occurrence of a fire or explosion being indicated when the magnitude of the received signal of the lower radio frequency is larger than the received signal of the higher radio frequency.

16. Apparatus according to claim 10, wherein said receiver further includes:

(a) a low-frequency filter for passing a low-frequency component of said at least one parameter of the received signal;
(b) an intermediate-frequency filter for passing an intermediate-frequency component of said at least one parameter of the received signal, and
(c) a high-frequency filter for passing a high-frequency component of said at least one parameter of the received signal;

and wherein said analyzer further includes means for comparing:
(a) said low-frequency component with a first predetermined threshold to provide an indication of whether a fire has occurred,
(b) said intermediate-frequency component with a second predetermined threshold to provide an indication of whether an explosion has occurred, and
(c) said high-frequency component with a third predetermined threshold to provide an indication of whether said projectile-penetration through a barrier has occurred.

17. The apparatus according to claim 16, further including a detector for detecting the magnitude of ultraviolet or infrared radiation emitted from said predetermined space; said processor including means for utilizing said detected magnitude of radiation, together with the analysis of said predetermined parameter of the received signal, to provide an indication whether a fire, explosion or projective-penetration has occurred in said space.

18. The apparatus according to claim 16, wherein said processor is programmed to update said threshold parameters in a learning phase during which analysis of the received signal produces an indication of a fire, explosion or projectile-penetration but analysis of the ultraviolet or infrared radiation received from the monitored space produces no such indication.

* * * * *